United States Patent
Saeki et al.

(10) Patent No.: US 8,860,341 B2
(45) Date of Patent: Oct. 14, 2014

(54) POWER REGENERATION DEVICE AND POWER CONVERSION DEVICE

(75) Inventors: Takahiro Saeki, Kitakyushu (JP); Takahiro Uchino, Kitakyushu (JP)

(73) Assignee: Kabushiki Kaisha Yaskawa Denki, Kitakyushu-Shi (JP)

( * ) Notice: Subject to any disclaimer, the term of this patent is extended or adjusted under 35 U.S.C. 154(b) by 229 days.

(21) Appl. No.: 13/615,595

(22) Filed: Sep. 14, 2012

(65) Prior Publication Data

US 2013/0214708 A1    Aug. 22, 2013

(30) Foreign Application Priority Data

Feb. 20, 2012   (JP) ................. 2012-033855

(51) Int. Cl.
   *H02P 3/18*   (2006.01)
(52) U.S. Cl.
   USPC .......................... 318/376; 318/803
(58) Field of Classification Search
   USPC .......... 318/375, 376, 799, 800, 801, 803, 812
   See application file for complete search history.

(56) References Cited

U.S. PATENT DOCUMENTS

| | | | |
|---|---|---|---|
| 4,673,825 A * | 6/1987 | Raddi et al. | 307/66 |
| 7,577,009 B2 * | 8/2009 | Yamamoto et al. | 363/163 |
| 8,019,460 B2 * | 9/2011 | Akaiwa et al. | 700/177 |
| 2003/0052544 A1 * | 3/2003 | Yamamoto et al. | 307/66 |

FOREIGN PATENT DOCUMENTS

| | | |
|---|---|---|
| JP | 57-206224 | 12/1982 |
| JP | 61-244273 | 10/1986 |
| JP | 02-106169 | 4/1990 |
| JP | 03-015271 | 1/1991 |
| JP | 07-322626 | 12/1995 |
| JP | 09-266695 | 10/1997 |
| JP | 2002-027757 | 1/2002 |
| JP | 2002-125364 | 4/2002 |
| JP | 2007-006589 | 1/2007 |
| JP | 2007-318893 | 12/2007 |
| JP | 2011-101473 | 5/2011 |
| JP | 2012-023903 | 2/2012 |

OTHER PUBLICATIONS

Japanese Office Action for corresponding JP Application No. 2012-033855, Dec. 10, 2013.

* cited by examiner

*Primary Examiner* — Rina Duda
(74) *Attorney, Agent, or Firm* — Mori & Ward, LLP (57) ABSTRACT

A power regeneration device according to an aspect of embodiments includes a voltage detecting unit, a signal processing unit, a phase detecting unit, and a power conversion unit. The signal processing unit generates, by using self-oscillation when the output of an AC detection signal from the voltage detecting unit is stopped due to a power outage, an AC signal whose frequency is the same as that of and whose phase is continued to that of the AC detection signal just before the stop. The phase detecting unit detects the phase of the AC power supply on the basis of the AC signal from the signal processing unit when power is recovered from the power outage.

13 Claims, 8 Drawing Sheets

POWER REGENERATION DEVICE AND POWER CONVERSION DEVICE

CROSS-REFERENCE TO RELATED APPLICATION

This application is based upon and claims the benefit of priority of the prior Japanese Patent Application No. 2012-033855, filed on Feb. 20, 2012, the entire contents of which are incorporated herein by reference.

FIELD

The embodiments discussed herein are directed to a power regeneration device and a power conversion device.

BACKGROUND

A power regeneration converter that is placed between an AC power supply and an inverter device for controlling a motor is known as a conventional power regeneration device. The power regeneration converter converts power supplied from the motor via the inverter device into AC power by using a switching element and supplies the AC power to the AC power supply in order to perform power regeneration when the motor is decelerated.

The power regeneration by the power regeneration converter is performed in synchronization with the phase of the AC power supply. In other words, the power regeneration converter detects an AC voltage from the AC power supply and detects the phase of the AC power supply on the basis of the detection result. Then, the power regeneration converter controls the switching element in accordance with the detected phase of the AC power supply to perform the power regeneration. The power regeneration converter has been known as disclosed in, for example, Japanese Laid-open Patent Publication No. 2011-101473.

In this case, it is preferable that the power regeneration device is, when a continuous operation is performed even during a power outage, for example, in a state where the device is operated in synchronization with the phase of the AC power supply at the time when power is recovered from the power outage.

SUMMARY

A power regeneration device according to an aspect of embodiments includes a voltage detecting unit, a signal processing unit, a phase detecting unit, and a power conversion unit. The voltage detecting unit detects an AC voltage from an AC power supply and outputs an AC detection signal according to the AC voltage. The signal processing unit generates, by using self-oscillation when an output of the AC detection signal from the voltage detecting unit is stopped, an AC signal whose frequency is the same as that of and whose phase is continued to that of the AC detection signal just before the stop. The phase detecting unit detects a phase of the AC power supply on the basis of the AC signal when power is recovered from the power outage. The power conversion unit converts DC power into AC power and regenerates the AC power to the AC power supply.

BRIEF DESCRIPTION OF DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF EMBODIMENTS

Hereinafter, a power regeneration device and a power conversion device according to embodiments of the present disclosure will be explained in detail with reference to the accompanying drawings. In addition, the embodiments disclosed below are not intended to limit the present invention.

First Embodiment

Figure 1:
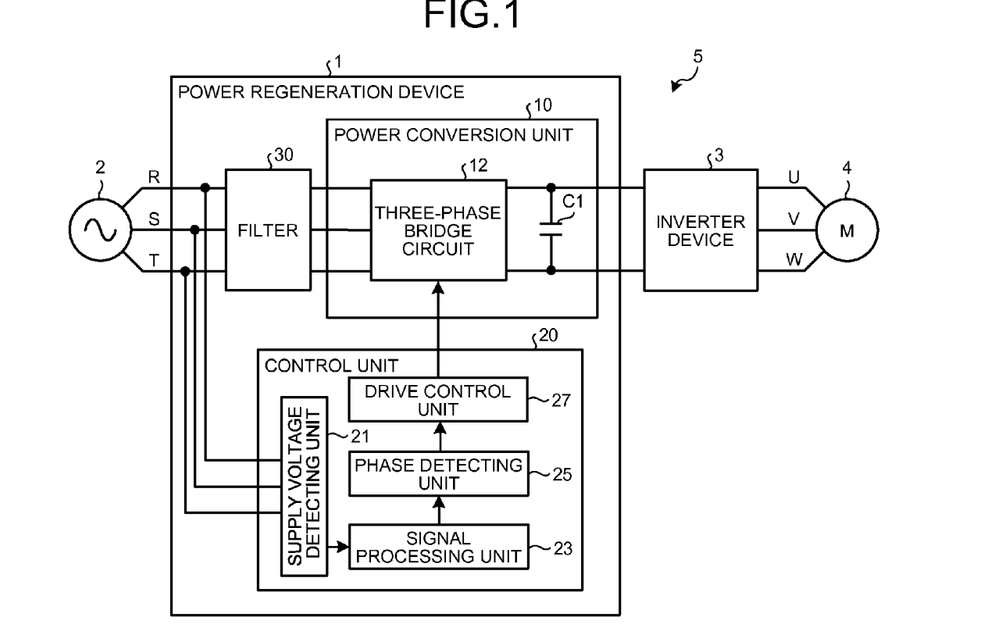
FIG. 1 is a diagram illustrating the configuration of a power regeneration device and a power conversion device according to a first embodiment.

First, a power regeneration device and a power conversion device according to the first embodiment will be explained. FIG. 1 is a diagram illustrating the configuration of a power regeneration device 1 and a power conversion device 5 according to the first embodiment. Herein, the power regeneration device 1 according to the first embodiment is equivalent to an example of a power regeneration converter device.

As illustrated in FIG. 1, the power regeneration device 1 according to the first embodiment is placed between a three-phase AC power supply 2 and an inverter device 3. The power regeneration device 1 performs power conversion from an alternating current to a direct current and power conversion from a direct current to an alternating current between the three-phase AC power supply 2 and the inverter device 3. The power conversion device 5 is constituted by the power regeneration device 1 and the inverter device 3. The power conversion device 5 switches a running state between a power running state in which a motor 4 is driven and a power regeneration state in which power is regenerated to the three-phase AC power supply 2.

During power running, the power regeneration device 1 functions as a converter device that converts AC power from the three-phase AC power supply 2 into DC power. The inverter device 3 converts the DC power converted by the power regeneration device 1 into AC power and supplies the AC power to the motor 4 to drive the motor 4.

On the other hand, during power regeneration, the inverter device 3 converts an induced electromotive force on the motor 4 caused by the deceleration of the motor 4 into to DC power to drive an internal switching element and supplies the DC power to the power regeneration device 1. The power regeneration device 1 converts the DC power from the inverter device 3 into AC power and supplies the AC power to the three-phase AC power supply 2 to perform power regeneration.

The power regeneration device 1 includes a power conversion unit 10 that is placed between the three-phase AC power supply 2 and the inverter device 3, a control unit 20 that controls the power conversion unit 10, and a filter 30 that is placed between the phase outputs of the three-phase AC power supply 2 and the power conversion unit 10.

Figure 3:
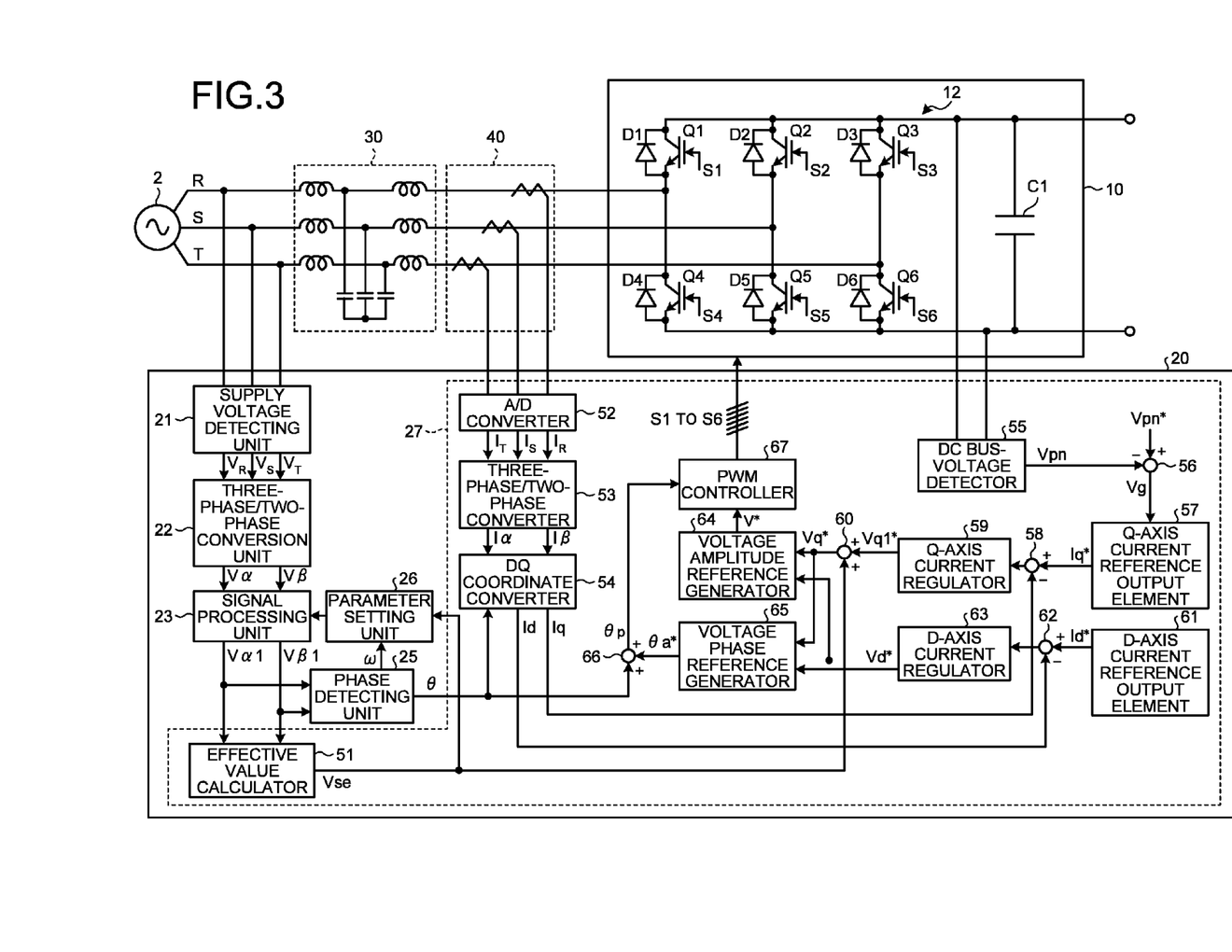
FIG. 3 is a diagram illustrating an example of the specific configuration of a control unit of the power regeneration device according to the first embodiment.

The power conversion unit 10 includes a three-phase bridge circuit 12 and a smoothing capacitor C1. The three-phase bridge circuit 12 is configured to connect six diodes D1 to D6 in a three-phase bridge connection manner and to connect switching elements Q1 to Q6 to the corresponding diodes in an anti-parallel connection manner, as illustrated in FIG. 3 described below, for example.

During power running, the three-phase bridge circuit 12 rectifies the AC voltage from the three-phase AC power supply 2 and the smoothing capacitor C1 smoothes the voltage rectified by the three-phase bridge circuit 12. This operation leads to accumulate DC power in the smoothing capacitor C1. Then, the DC power is supplied to the inverter device 3.

The three-phase bridge circuit 12 also has a power regeneration function for providing power supplied from the motor 4 via the inverter device 3 to the three-phase AC power supply 2. In other words, the three-phase bridge circuit 12 converts DC power, which is supplied from the inverter device 3 and accumulated in the smoothing capacitor C1, into to AC power and supplies the AC power to the three-phase AC power supply 2.

The three-phase bridge circuit 12 is controlled by the control unit 20. The control unit 20 includes a supply voltage detecting unit 21, a signal processing unit 23, a phase detecting unit 25, and a drive control unit 27.

The supply voltage detecting unit 21 repeatedly and continuously detects instantaneous values of the AC voltage from the three-phase AC power supply 2 and outputs a detection signal (hereinafter, "AC detection signal") according to the detection result to the signal processing unit 23. The AC detection signal is a signal having a waveform corresponding to the voltage waveform of the three-phase AC power supply 2.

The signal processing unit 23 makes the AC detection signal from the supply voltage detecting unit 21 pass therethrough and outputs the AC detection signal to the phase detecting unit 25 in normal time. However, when the input of the AC detection signal is stopped due to a power outage or the like, the signal processing unit 23 enters a self-oscillation state. As a result, the signal processing unit 23 shifts to a residual vibration state in which the AC detection signal until then is slowly attenuated. The signal processing unit 23 generates an AC signal (hereinafter, "residual vibration signal"), whose frequency is the same as that of and whose phase is continued to that of the AC detection signal just before the stop, by using the residual vibration, and outputs the AC signal to the phase detecting unit 25. Herein, self-oscillation means that continuous oscillation is performed as residual vibration that is gradually attenuated in a state where an input does not exist.

The signal processing unit 23 is constituted by a secondary bandpass filter. The natural angular frequency of the bandpass filter is set to accord with the frequency of the AC detection signal in such a manner that the AC detection signal from the supply voltage detecting unit 21 can pass through the signal processing unit 23. The AC detection signal becomes a signal whose high frequency component is reduced by passing through the signal processing unit 23 constituted by the secondary bandpass filter. Therefore, the phase detecting unit 25 can perform the phase detection of the three-phase AC power supply 2 with high precision.

The attenuation coefficient of the bandpass filter is adjusted in such a manner that the signal processing unit 23 can generate a desired residual vibration signal continuous with the AC detection signal when the input of the AC detection signal is stopped. The characteristic of the bandpass filter will be below explained in detail. It is only necessary that the signal processing unit 23 has a configuration that it can generate a residual vibration signal by self-oscillation. Therefore, the configuration is not limited to the secondary bandpass filter. For example, the signal processing unit 23 may have a secondary low-pass filter or the other configuration.

The phase detecting unit 25 detects the phase of the three-phase AC power supply 2 on the basis of the AC signal from the signal processing unit 23. More specifically, when the AC detection signal is output through the signal processing unit 23, the phase detecting unit 25 detects the phase of the three-phase AC power supply 2 on the basis of the AC detection signal. On the other hand, when the residual vibration signal is output from the signal processing unit 23, the phase detecting unit 25 detects the phase of the three-phase AC power supply 2 on the basis of the residual vibration signal.

The drive control unit 27 drives the switching elements of the three-phase bridge circuit 12 on the basis of the phase of the three-phase AC power supply 2 detected by the phase detecting unit 25 to perform power conversion according to an operating state. More specifically, if the operating state is a power regeneration state, the drive control unit 27 converts the DC voltage of the smoothing capacitor C1 into an AC voltage and outputs the AC voltage to the three-phase AC power supply 2. Moreover, if the operating state is a power running state, the drive control unit 27 converts the AC voltage from the three-phase AC power supply 2 into a DC voltage and outputs the DC voltage to the smoothing capacitor C1.

Figure 2:
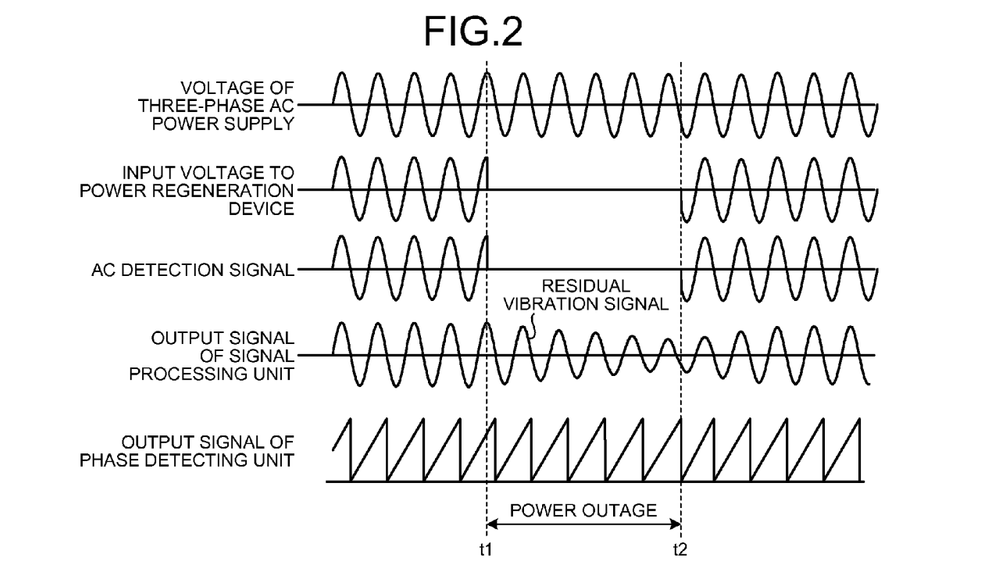
FIG. 2 is a diagram illustrating the state of each signal when a power outage occurs.

FIG. 2 is a diagram illustrating a state of each signal when a power outage occurs. The state of the voltage of the three-phase AC power supply 2, the state of the voltage from the three-phase AC power supply 2 to the power regeneration device 1, the state of the AC detection signal from the supply voltage detecting unit 21, the state of the signal from the signal processing unit 23, and the state of the signal from the phase detecting unit 25 are illustrated in FIG. 2.

A power outage generally occurs due to the failure of a power transmission system or a power reception system, and rarely occurs due to the inner problem of a power station. In the case of the power outage, because the generation of electric power is continued in the power station, the three-phase AC power supply 2 in the power station is continuously operated and the other end side (the input side of the power regeneration device 1) is in the power outage state as illustrated in FIG. 2. Therefore, the phase of the supply voltage supplied to the power regeneration device 1 at power recovery (at the failure recovery of the power transmission system or the power reception system) is the same as that of the supply voltage when the power outage does not occur.

The AC detection signal is output from the supply voltage detecting unit 21 to the signal processing unit 23 (up to timing t1) in the state where the supply of power is performed from the three-phase AC power supply 2 to the power regeneration device 1. When the AC detection signal is output from the supply voltage detecting unit 21, the signal processing unit 23 makes the AC detection signal pass therethrough and outputs it to the phase detecting unit 25. The phase detecting unit 25 detects the phase of the three-phase AC power supply 2 on the basis of the AC detection signal input through the signal processing unit 23.

After that, when the supply of power from the three-phase AC power supply 2 to the power regeneration device 1 is stopped by a power outage (timing t1 to timing t2), the output of the AC detection signal from the supply voltage detecting unit 21 is stopped. When the output of the AC detection signal from the supply voltage detecting unit 21 is stopped, the signal processing unit 23 enters a self-oscillation state. In this case, the signal processing unit 23 generates a residual vibration signal, whose frequency is the same as that of and whose phase is continued to that of the AC detection signal input just before the power outage, by using residual vibration and outputs the residual vibration signal to the phase detecting unit 25. The phase detecting unit 25 detects the phase of the three-phase AC power supply 2 on the basis of the residual vibration signal from the signal processing unit 23.

After that, when the supply of power from the three-phase AC power supply 2 to the power regeneration device 1 is resumed by a power recovery, the output of the AC detection signal from the supply voltage detecting unit 21 to the signal processing unit 23 is resumed (from timing t2). The signal processing unit 23 makes the AC detection signal from the supply voltage detecting unit 21 pass therethrough and outputs it to the phase detecting unit 25.

The phase detecting unit 25 detects the phase of the three-phase AC power supply 2 on the basis of the AC detection signal input through the signal processing unit 23. Herein, the amplitude of the AC detection signal output through the signal processing unit 23 is smaller than that of the AC detection signal from the supply voltage detecting unit 21 at the power recovery. This is caused by a secondary delay of the signal processing unit 23 that is a secondary filter. The amplitude of the AC detection signal from the signal processing unit 23 becomes larger with the passage of time after the power recovery, and finally has the same size as that of the AC detection signal before the power outage.

As described above, the power regeneration device 1 according to the first embodiment generates an AC signal, whose frequency is the same as that of and whose phase is continued to that of the AC detection signal just before the stop, by using residual vibration when the three-phase AC power supply 2 enters the power outage state, and detects the phase of the three-phase AC power supply 2. Therefore, because the phase of the three-phase AC power supply 2 can be instantaneously and precisely detected when power is recovered from the power outage, out-of-synchronization with the phase of the three-phase AC power supply 2 can be suppressed and thus continuous operations can be performed with high precision in the power regeneration device 1.

Hereinafter, an example of the specific configuration of the power regeneration device 1 according to the first embodiment will be explained. FIG. 3 is a diagram illustrating an example of the specific configuration of the power regeneration device 1 according to the first embodiment.

The control unit 20 of the power regeneration device 1 according to the first embodiment includes the supply voltage detecting unit 21, a three-phase/two-phase conversion unit 22, the signal processing unit 23, the phase detecting unit 25, a parameter setting unit 26, and the drive control unit 27, as illustrated in FIG. 3. Herein, the supply voltage detecting unit 21 and the three-phase/two-phase conversion unit 22 are equivalent to an example of a voltage detecting unit.

The supply voltage detecting unit 21 detects the voltage of the three-phase AC power supply 2. More specifically, the supply voltage detecting unit 21 monitors connection points between the filter 30 and the R-phase, S-phase, and T-phase outputs of the three-phase AC power supply 2 to detect instantaneous values of the three-phase voltages of the three-phase AC power supply 2, and outputs AC detection signals $V_R$, $V_S$, and $V_T$ that are changed in accordance with the instantaneous values of the three-phase voltages.

The filter 30 is constituted by six inductors and three capacitors. The six inductors are arranged between the phase outputs of the three-phase AC power supply 2 and the power conversion unit 10 and every two of them are serially connected. Each of the three capacitors is connected between a neutral point and a point between the two inductors for the corresponding phase. However, the configuration of the filter 30 is not limited to the configuration illustrated in FIG. 3.

The three-phase/two-phase conversion unit 22 converts the AC detection signals $V_R$, $V_S$, and $V_T$ into αβ components of perpendicular two axes on fixed coordinates and calculates a fixed-coordinate voltage vector of an αβ-axis coordinate system whose vector components are an α-axes-direction AC detection signal Vα and a β-axis-direction AC detection signal Vβ.

When the AC detection signals Vα and Vβ are output from the three-phase/two-phase conversion unit 22, the signal processing unit 23 makes the AC detection signals Vα and Vβ from the three-phase/two-phase conversion unit 22 pass therethrough and outputs them to the phase detecting unit 25 as AC signals Vα1 and Vβ1. On the other hand, when the AC detection signals Vα and Vβ are not output from the three-phase/two-phase conversion unit 22 due to a power outage or the like, the signal processing unit 23 enters a self-oscillation state. When entering the self-oscillation state, the signal processing unit 23 generates residual vibration signals, whose frequencies are the same as those of and whose phases are continued to those of the AC detection signals Vα and Vβ just before the stop, by using residual vibration, and outputs them to the phase detecting unit 25 as the AC signals Vα1 and Vβ1.

The signal processing unit 23 can be constituted by a secondary active bandpass filter (hereinafter, it may be referred to as "active BPF") as described below. This secondary active BPF is provided for each of the AC detection signals Vα and Vβ. In this case, a continuous-system transfer function of the secondary active BPF can be expressed by, for example, the following Equation (1). Herein, "$X_{(s)}$" is an input (Vα, Vβ), "$Y_{(s)}$" is an output (Vα1, Vβ1), "ζ" is an attenuation coefficient, "$\omega_0$" is a natural angular frequency, and "s" is a Laplacian operator.

$$Y_{(s)} = \frac{\omega_0^2 s}{s^2 + 2\zeta\omega_0 s + \omega_0^2} X_{(s)} \quad (1)$$

In order to suppress a high gain characteristic at the natural angular frequency $\omega_0$ due to a resonance characteristic, a final output $Y_{final(s)}$ of the active BPF is obtained by multiplying a gain K as expressed in the following Equation (2). The gain K is set so that the gain characteristic of the signal processing unit 23 becomes 0 dB at the natural angular frequency $\omega_0$. For example, the gain characteristic of the signal processing unit 23 can be 0 dB at the natural angular frequency $\omega_0$ by setting the gain K as expressed in the following Equation (3).

$$Y_{final(s)} = KY_{(s)} \quad (2)$$

$$K = \frac{2\zeta}{\omega_0} \quad (3)$$

Figure 4A:
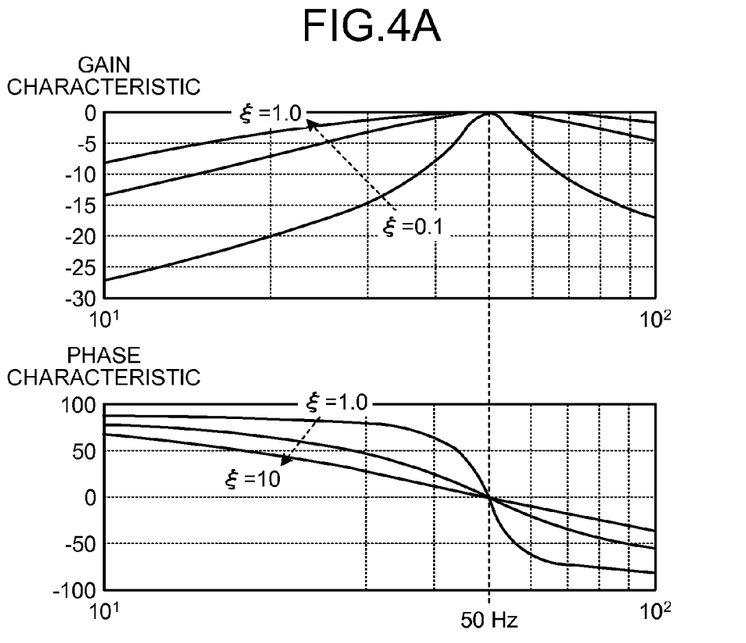
FIG. 4A is a diagram illustrating the frequency characteristic of a signal processing unit when a natural angular frequency is 50 Hz.
Figure 4B:
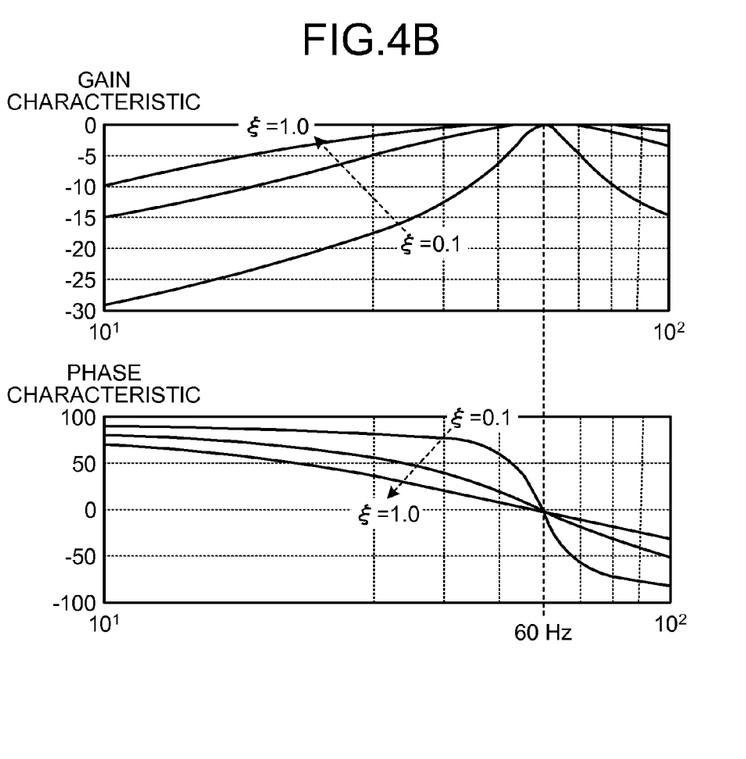
FIG. 4B is a diagram illustrating the frequency characteristic of the signal processing unit when the natural angular frequency is 60 Hz.

FIGS. 4A and 4B are diagrams illustrating an example of the frequency characteristic of the signal processing unit 23. When the natural angular frequency $\omega_0$ is 50 Hz, the phase characteristic of the signal processing unit 23 defined in the equations is 0 [deg] near 50 Hz and its gain characteristic is 0 dB near 50 Hz as illustrated in FIG. 4A. On the other hand, when the natural angular frequency $\omega_0$ is 60 Hz, the phase characteristic of the signal processing unit 23 is 0 [deg] near 60 Hz and its gain characteristic is 0 dB near 60 Hz as illustrated in FIG. 4B.

The natural angular frequency $\omega_0$ in the signal processing unit 23 is set by the parameter setting unit 26 so as to correspond to the frequency of the three-phase AC power supply 2. For example, when the frequency of the three-phase AC power supply 2 is 50 Hz, the parameters of the signal processing unit 23 are set to have the phase and gain characteristics illustrated in FIG. 4A, for example. On the other hand, when the frequency of the three-phase AC power supply 2 is 60 Hz, the parameters of the signal processing unit 23 are set to have the phase and gain characteristics illustrated in FIG. 4B, for example.

Moreover, the value of the attenuation coefficient $\zeta$ set within a range of $0<\zeta<1$. As a result, the signal processing unit 23 enters the self-oscillation state after the inputs of the AC detection signals $V\alpha$ and $V\beta$ are stopped. When entering the self-oscillation state, the signal processing unit 23 outputs residual vibration signals, whose frequencies are the same as those of and whose phases are continued to those of the AC detection signals $V\alpha$ and $V\beta$ just before the stop, by using residual vibration as the AC signals $V\alpha1$ and $V\beta1$ (see FIG. 2). In this case, the smaller the attenuation coefficient $\zeta$, the longer the damping time of the residual vibration signals. Therefore, the output of the signal processing unit 23 can correspond to a comparatively long power outage state.

When the active BPF in the signal processing unit 23 is realized by a digital circuit, a discrete-system transfer function for mounting the active BPF on the control unit 20 can be expressed by the following Equation (4). The final output of the active BPF is obtained by multiplying the gain K as expressed in the following Equation (5). Herein, $X_{(k)}$ is the present input, $X_{(k-1)}$ is an input before one sampling time, $Y_{(k)}$ is the present output, $Y_{(k-1)}$ is an output before one sampling time, $Y_{(k-2)}$ is an output before two sampling times, and $A_1$, $A_2$, $B_1$, and $B_2$ are coefficients.

$$Y_{(k)} = B_1 X_{(k)} + B_2 X_{(k-1)} + A_1 Y_{(k-1)} + A_2 Y_{(k-2)} \quad (4)$$

$$Y_{final(k)} = KY_{(k)} \quad (5)$$

Figure 5:
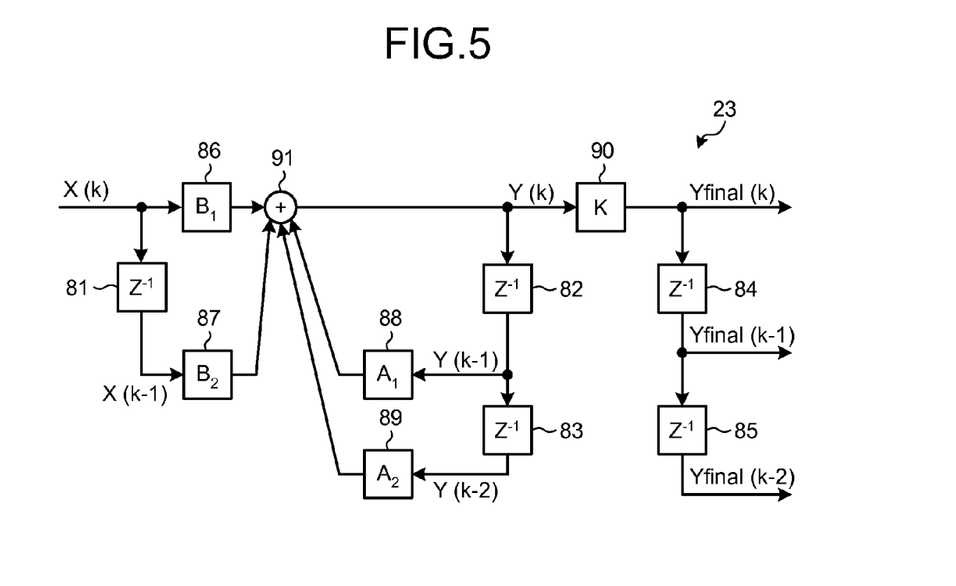
FIG. 5 is a diagram illustrating an example of an active BPF that constitutes the signal processing unit.

From Equations (4) and (5), the signal processing unit 23 can be constituted by a digital circuit that includes delay elements 81 to 85, multipliers 86 to 90, and an adder 91, as illustrated in FIG. 5, for example. FIG. 5 is a diagram illustrating an example of an active BPF that constitutes the signal processing unit 23.

It has been explained that the signal processing unit 23 is constituted by the secondary bandpass filter as an example. As described above, the signal processing unit 23 is not limited to the secondary bandpass filter. For example, the signal processing unit 23 may be constituted by a secondary low-pass filter (hereinafter, it may be referred to as "LPF").

In this case, a continuous-system transfer function of the secondary active LPF can be expressed by the following Equation (6), for example. Herein, "$X_{(s)}$" is an input ($V\alpha$, $V\beta$), "$Y_{(s)}$" is an output ($V\alpha1$, $V\beta1$), "$\zeta$" is an attenuation coefficient, "$\omega_0$" is a natural angular frequency, and "s" is a Laplacian operator.

$$Y_{(s)} = \frac{\zeta \omega_0^2}{s^2 + 2\zeta\omega_0 s + \omega_0^2} X_{(s)} \quad (6)$$

Figure 6:
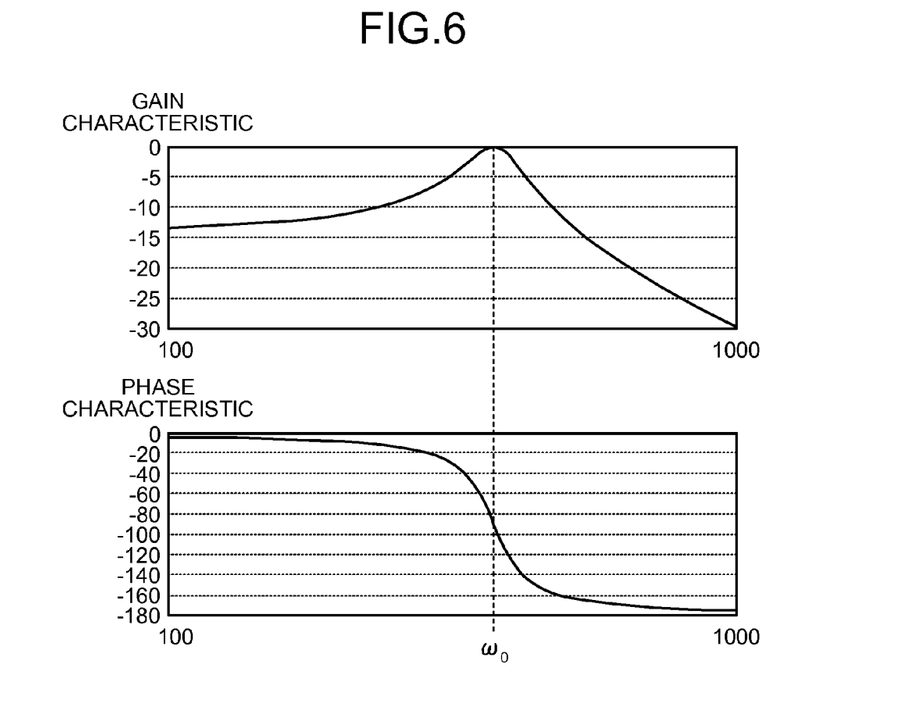
FIG. 6 is a diagram illustrating an example of the frequency characteristic of an active LPF that constitutes the signal processing unit.

The active LPF defined in Equation (6) has a gain characteristic of 0 [deg] near the natural angular frequency $\omega_0$ and has a phase characteristic that the phase of an output signal is delayed by 90 degrees with respect to the phase of an input signal near the natural angular frequency $\omega_0$, as illustrated in FIG. 6. FIG. 6 is a diagram illustrating an example of the frequency characteristic of the active LPF that constitutes the signal processing unit 23. Herein, the natural angular frequency $\omega_0$ of the active LPF is set by the parameter setting unit 26 so as to correspond to the frequency of the three-phase AC power supply 2 as described below.

Figure 7:
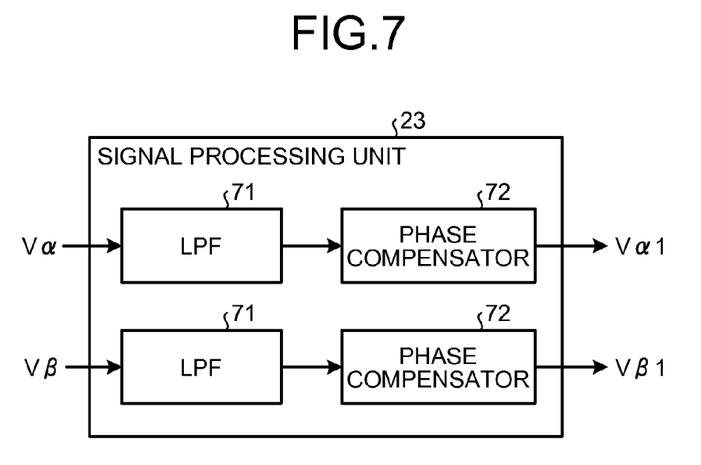
FIG. 7 is a diagram illustrating a configuration example of the signal processing unit.

When the signal processing unit 23 is constituted by the secondary LPF, an output phase is delayed by 90 degrees. Therefore, the signal processing unit 23 includes phase compensators 72 that are respectively provided at the output sides of secondary LPFs 71 to advance the phase 90 degrees as illustrated in FIG. 7. As a result, a phase shift caused by the secondary LPF 71 can be compensated. Meanwhile, the phase compensator 72 may be provided at the input side of the secondary LPF 71.

The phase compensator 72 is not necessarily provided in the signal processing unit 23. For example, the phase compensator 72 may be provided at the output side of the phase detecting unit 25. Alternatively, the phase compensator 72 may be provided at the output sides of the supply voltage detecting unit 21 or the three-phase/two-phase conversion unit 22. In other words, the phase compensator 72 may be placed anywhere if the phase shift caused by the secondary LPF 71 can be compensated consequently.

It has been explained that the secondary BPF or the secondary LPF is employed as an example of the signal processing unit 23. The signal processing unit 23 is not limited to these secondary filters. For example, a secondary high-pass filter may be employed as the signal processing unit 23.

Returning to FIG. 3, the control unit 20 of the power regeneration device 1 will be continuously explained. The phase detecting unit 25 detects the voltage phase of the three-phase AC power supply 2 on the basis of the AC signals $V\alpha1$ and $V\beta1$ from the signal processing unit 23 and outputs the voltage phase as a voltage phase detection value $\theta$. For example, when the AC signals $V\alpha1$ and $V\beta1$ are converted into the dq components of the dq-axis rectangular coordinate system, the phase detecting unit 25 calculates the voltage phase of the three-phase AC power supply 2 so that the d-axis component becomes zero. The phase detecting unit 25 outputs the voltage phase detection value θ according to the calculated voltage phase of the three-phase AC power supply 2.

The phase detecting unit 25 detects an angular frequency ω of the three-phase AC power supply 2 on the basis of the AC signals Vα1 and Vβ1 from the signal processing unit 23, and outputs the angular frequency to the parameter setting unit 26. Moreover, the phase detecting unit 25 can also detect information according to the angular frequency ω of the three-phase AC power supply 2, for example, a power supply frequency f of the three-phase AC power supply 2.

The parameter setting unit 26 sets the parameters of the signal processing unit 23 on the basis of information (hereinafter, "power supply frequency information") according to the angular frequency ω or the power supply frequency f of the three-phase AC power supply 2 detected by the phase detecting unit 25. As a result, the parameters of the signal processing unit 23 can be set in accordance with the angular frequency ω of the three-phase AC power supply 2, and thus the filter characteristic of the signal processing unit 23 can be matched with the angular frequency ω of the three-phase AC power supply 2.

For example, when the signal processing unit 23 has the configuration of the active BPF illustrated in FIG. 5, the parameter setting unit 26 sets the natural angular frequency $\omega_0$ as the angular frequency ω of the three-phase AC power supply 2. Moreover, the parameter setting unit 26 selects the values of the coefficients $A_1, A_2, B_1$, and $B_2$ such that the gain characteristic at the natural angular frequency $\omega_0$ becomes 0 dB, and sets the values in the signal processing unit 23. As a result, a parameter according to the angular frequency ω of the three-phase AC power supply 2 is set in the signal processing unit 23.

Setting a parameter in the signal processing unit 23 by the parameter setting unit 26 can be performed at an operation start timing, a periodic timing, or an arbitrarily set timing. For example, the parameter setting unit 26 can perform parameter setting on the signal processing unit 23 at the timing when the supply of power from the three-phase AC power supply 2 to the power regeneration device 1 is started. Moreover, the parameter setting unit 26 can perform parameter setting on the signal processing unit 23 at an arbitrary timing when a driving operation by the power regeneration device 1 is not performed.

Figure 8:
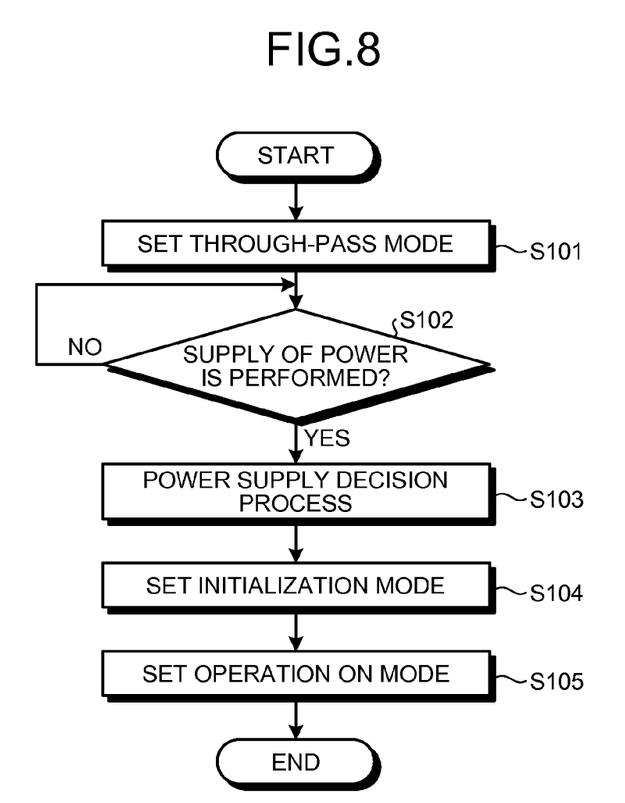
FIG. 8 is a flowchart of an initial operation that is performed by the control unit.

Now, an initial operation that includes parameter setting on the signal processing unit 23 will be specifically explained. This initial operation is a process that is executed by the control unit 20 when the use of the power regeneration device 1 is started or when power is recovered from the power outage. FIG. 8 is a flowchart of an initial operation that is performed by the control unit 20. It is assumed that the signal processing unit 23 has the configuration illustrated in FIG. 5.

First, the control unit 20 sets a through-pass mode in the signal processing unit 23 in an initial operation (Step S101). A through-pass mode is a mode for passing an input signal through the signal processing unit 23 without a filtering process. The set of a through-pass mode is performed, for example, by outputting a reference signal from the parameter setting unit 26 to the signal processing unit 23.

In the through-pass mode, state variables are set as expressed in the following Equations (7) to (9) in preparation for an initialization mode.

$$Y_{final(k-2)} = X_{(k-2)} \quad (7)$$

$$Y_{final(k-1)} = X_{(k-1)} \quad (8)$$

$$Y_{final(k)} = X_{(k)} \quad (9)$$

The Equation (9) means that the same value as X(k) that is the present input is set to the value of Y(k) that is the present output. The signal processing unit 23 executes a process indicated by Equation (9) in the through-pass mode to make the input signal pass therethrough without the filtering process.

When the signal processing unit 23 that functions as an active BPF is supplied with a signal having a single frequency as X(k), the phase delay of the output signal to the input signal is zero and the gain is 0 dB if the cutoff frequency of the active BPF is identical with the frequency of the input signal. Therefore, relational expressions of Equations (8) and (7), which are $Y_{final(k-1)} = X_{(k-1)}$ and $Y_{final(k-2)} = X_{(k-2)}$, as well as Equation (9) are accomplished. Moreover, relational expressions of Equations (10) and (11) to be described below are accomplished from the configuration of the active BPF illustrated in FIG. 5.

On the other hand, when the signal processing unit 23 starts the filtering process, it needs time to become a steady state because Y(k) rises up from zero or indefinite values when the state quantities of $Y_{(k-1)}, Y_{(k-2)}$, and $X_{(k-1)}$ are zero or indefinite values. Therefore, the signal processing unit 23 samples delays $X_{(k-1)}$ and $X_{(k-2)}$ of the input signal and previously performs the processes of Equations (7) to (11) to establish the internal states of $Y_{(k-1)}$ and $Y_{(k-2)}$, and thus immediately can start the filtering process from the steady state.

Next, the control unit 20 determines whether the supply of power from the three-phase AC power supply 2 to the power regeneration device 1 is performed (Step S102). Whether the supply of power is performed is determined by whether the AC detection signals Vα and Vβ passing through the signal processing unit 23 without change are detected by the drive control unit 27.

When the supply of power from the three-phase AC power supply 2 to the power regeneration device 1 is started in accordance with the connection between the three-phase AC power supply 2 and the power regeneration device 1 or in accordance with the recovery from a long power outage (Step S102; Yes), the control unit 20 performs a power supply decision process (Step S103). In the power supply decision process, the phase detecting unit 25 detects the phase, the angular frequency, or the like of the three-phase AC power supply 2 on the basis of the AC detection signals Vα and Vβ passing through the signal processing unit 23 (in the through-pass mode) without change. The phase detecting unit 25 outputs the detection result to the parameter setting unit 26 and the drive control unit 27.

When the power supply decision process is terminated, the control unit 20 sets an initialization mode in the signal processing unit 23 (Step S104). In the initialization mode, the parameter setting unit 26 selects the values of the coefficients $A_1, A_2, B_1$, and $B_2$ according to the power supply frequency information from the phase detecting unit 25 and sets them in the signal processing unit 23. As a result, a parameter according to the angular frequency ω of the three-phase AC power supply 2 is set in the signal processing unit 23.

Moreover, when the mode is changed from the through-pass mode to an operation ON mode, the internal variables of the active BPF are set as expressed in the following Equations (10) and (11) on the basis of the state variables indicated in Equations (7) to (9).

$$Y_{(k-2)} = Y_{final(k-2)}/K \quad (10)$$

$$Y_{(k-1)} = Y_{final(k-1)}/K \quad (11)$$

When the initialization mode is terminated, the control unit 20 sets the operation ON mode in the signal processing unit 23 (Step S105). In the operation ON mode, the signal processing unit 23 operates as a secondary active BPF on the basis of the parameter set by the parameter setting unit 26. As a result, a residual vibration signal can be output from the signal processing unit 23 during a power outage.

As described above, the power regeneration device 1 performs change control in order of the through-pass mode and the initialization mode in the initial operation before the operation mode of the signal processing unit 23 is changed to the operation ON mode.

Because the operation mode of the signal processing unit 23 is the through-pass mode at the beginning of an initial operation, the phase, the angular frequency, or the like of the three-phase AC power supply 2 can be quickly detected by the phase detecting unit 25. As a result, for example, the driving operation in the power regeneration device 1 can be quickly started.

Moreover, because the operation mode of the signal processing unit 23 is shifted to the initialization mode after the through-pass mode, the signal processing unit 23 can be quickly operated as a filter when the mode of the signal processing unit 23 becomes the operation ON mode.

Returning to FIG. 3, the control unit 20 of the power regeneration device 1 will be continuously explained. The drive control unit 27 includes an effective value calculator 51, an A/D converter 52, a three-phase/two-phase converter 53, a dq coordinate converter 54, a DC bus-voltage detector 55, and a subtractor 56. The drive control unit 27 further includes a q-axis current reference output element 57, a q-axis current deviation calculator 58, a q-axis current regulator 59, a q-axis voltage reference compensator 60, a d-axis current reference output element 61, a d-axis current deviation calculator 62, and a d-axis current regulator 63. Furthermore, the drive control unit 27 includes a voltage amplitude reference generator 64, a voltage phase reference generator 65, an adder 66, and a PWM controller 67.

The effective value calculator 51 detects an effective voltage value Vse of the three-phase AC power supply 2 on the basis of the AC signals Vα1 and Vβ1 from the signal processing unit 23.

The A/D converter 52 converts phase current detection values $I_R$, $I_S$, and $I_T$ detected by a current detecting unit 40 into digital values by using an AD conversion. Moreover, the phase current detection value $I_R$ is an instantaneous value of an R-phase current, the phase current detection value $I_S$ is an instantaneous value of an S-phase current, and the phase current detection value $I_T$ is an instantaneous value of a T-phase current. Moreover, a current sensor that detects a current by using a Hall element that is a magnetoelectric transducer, for example, can be employed as the current detecting unit 40.

The three-phase/two-phase converter 53 converts the phase current detection values $I_R$, $I_S$, and $I_T$ into the αβ components of perpendicular two axes on fixed coordinates, and calculates the fixed-coordinate current vector of the αβ-axis coordinate system whose vector components are an α-axis-direction current value Iα and a β-axis-direction current value Iβ.

The dq coordinate converter 54 converts the αβ-axis coordinate-system components from the three-phase/two-phase converter 53 on the basis of the voltage phase detection value θ detected by the phase detecting unit 25 to calculate the q-axis and d-axis components of the dq-axis rotation coordinate system. As a result, the dq coordinate converter 54 calculates a q-axis current value Iq and a d-axis current value Id.

The DC bus-voltage detector 55 detects the inverter-device-side DC voltage of the power conversion unit 10. More specifically, the DC bus-voltage detector 55 detects a voltage value between the terminals of the smoothing capacitor C1 as a DC voltage value Vpn and outputs the voltage value to the subtractor 56.

The subtractor 56 subtracts the DC voltage value Vpn output from the DC bus-voltage detector 55 from a voltage reference Vpn* and outputs the result to the q-axis current reference output element 57 as a differential voltage value Vg.

The q-axis current reference output element 57 generates a q-axis current reference Iq* on the basis of the differential voltage value Vg from the subtractor 56, and outputs it to the q-axis current deviation calculator 58. The q-axis current reference Iq* is a target current value of an active current. The q-axis current deviation calculator 58 calculates a q-axis current deviation that is a deviation between the q-axis current reference Iq* and the q-axis current value Iq, and outputs it to the q-axis current regulator 59.

The q-axis current regulator 59 regulates a q-axis voltage reference Vq1* so that the deviation between the q-axis current reference Iq* and the q-axis current value Iq becomes zero, and outputs it to the q-axis voltage reference compensator 60. The q-axis voltage reference compensator 60 adds the effective voltage value Vse from the effective value calculator 51 to the q-axis voltage reference Vq1* from the q-axis current regulator 59, and outputs it to the voltage amplitude reference generator 64 and the voltage phase reference generator 65 as a q-axis voltage reference Vq*.

The d-axis current reference output element 61 generates a d-axis current reference Id* and outputs it to the d-axis current deviation calculator 62. The d-axis current reference Id* is a target current value of a reactive current. The d-axis current reference Id* is set to zero when a power factor is "1", for example. The d-axis current deviation calculator 62 calculates a d-axis current deviation that is a deviation between the d-axis current reference Id* and the d-axis current value Id, and outputs it to the d-axis current regulator 63. The d-axis current regulator 63 regulates a d-axis voltage reference Vd* so that the deviation between the d-axis current reference Id* and the d-axis current value Id becomes zero, and outputs it to the voltage amplitude reference generator 64 and the voltage phase reference generator 65.

The voltage amplitude reference generator 64 calculates an output voltage reference V* on the basis of the q-axis voltage reference Vq* from the q-axis voltage reference compensator 60 and the d-axis voltage reference Vd* from the d-axis current regulator 63. For example, the voltage amplitude reference generator 64 calculates the output voltage reference V* from the following Equation (12).

$$V^* = \sqrt{Vd^{*2}/Vq^{*2}} \qquad (12)$$

The voltage phase reference generator 65 calculates an output phase reference θa* on the basis of the q-axis voltage reference Vq* from the q-axis voltage reference compensator 60 and the d-axis voltage reference Vd* from the d-axis current regulator 63. For example, the voltage phase reference generator 65 calculates the output phase reference θa* from the following Equation (13).

$$\theta a^* = \tan^{-1}(Vq^*/Vd^*) \qquad (13)$$

The adder 66 adds the voltage phase detection value θ from the phase detecting unit 25 to the output phase reference θa* from the voltage phase reference generator 65 to calculate a phase θp.

The PWM controller 67 calculates three-phase AC voltage references, namely, output voltage references $V_R^*$, $V_S^*$, and $V_T^*$ with respect to the phases of the three-phase AC power supply 2, on the basis of the output voltage reference V* from the voltage amplitude reference generator 64 and the phase θp calculated by the adder 66. For example, the PWM controller 67 calculates the R-phase output voltage reference $V_R^*$, the S-phase output voltage reference $V_S^*$, and the T-phase output voltage reference $V_T^*$, from the following Equations (14) to (16).

$$V_R^* = V^* \times \sin(\theta p) \quad (14)$$

$$V_S^* = V^* \times \sin(\theta p - (2\pi/3)) \quad (15)$$

$$V_T^* = V^* \times \sin(\theta p + (2\pi/3)) \quad (16)$$

The PWM controller 67 generates PWM signals S1 to S6 for respectively controlling the switching elements Q1 to Q6 of the power conversion unit 10 on the basis of the output voltage references $V_R^*$, $V_S^*$, and $V_T^*$. As a result, the three-phase AC voltages according to the output voltage references $V_R^*$, $V_S^*$, and $V_T^*$ are output from the power conversion unit 10. For example, a self-arc-extinguishing semiconductor device such as IGBT and MOSFET is used as the switching elements Q1 to Q6. The PWM signals S1 to S6 become ON references by which the switching elements Q1 to Q6 enter ON states at a High level.

As described above, the power regeneration device 1 according to the first embodiment enters the self-oscillation state when the three-phase AC power supply 2 is in a power outage state, generates the residual vibration signal, whose frequency is the same as that of and whose phase is continued to that of the AC detection signal just before the stop, by using residual vibration, and detects the phase of the three-phase AC power supply 2. Therefore, out-of-synchronization with the phase of the three-phase AC power supply 2 at the power recovery can be suppressed, and thus the power regeneration device 1 can perform continuous operations with high precision.

In the example illustrated in FIG. 3, it has been explained that the AC detection signals $V\alpha$ and $V\beta$ obtained by converting the AC detection signals $V_R$, $V_S$, and $V_T$ detected by the supply voltage detecting unit 21 by using the three-phase/two-phase conversion unit 22 are input into the signal processing unit 23. However, the arrangement of the signal processing unit 23 is not limited to this.

Figure 9:
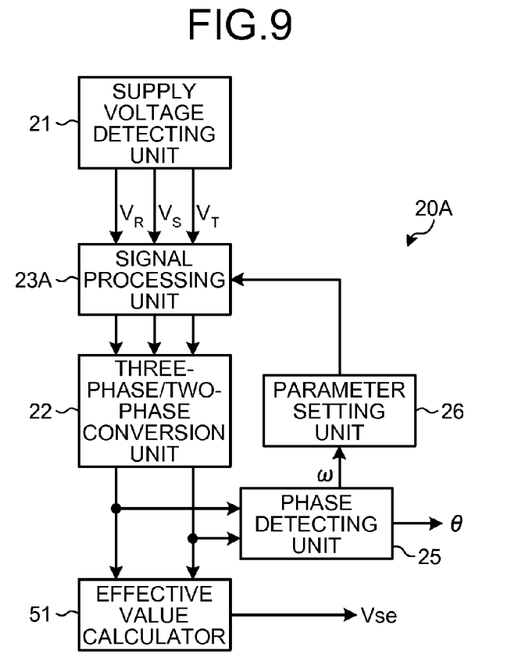
FIG. 9 is a diagram illustrating a part of another configuration of the control unit of the power regeneration device.

For example, as in a control unit 20A illustrated in FIG. 9, a signal processing unit 23A may be placed between the supply voltage detecting unit 21 and the three-phase/two-phase conversion unit 22. FIG. 9 is a diagram illustrating a part of another configuration of the control unit in the power regeneration device 1. In the control unit 20A illustrated in FIG. 9, the signal processing unit 23A makes the AC detection signals $V_R$, $V_S$, and $V_T$ from the supply voltage detecting unit 21 pass therethrough and outputs them to the three-phase/two-phase conversion unit 22, when the AC detection signals $V_R$, $V_S$, and $V_T$ are output from the supply voltage detecting unit 21. On the other hand, the signal processing unit 23A generates the residual vibration signals continuous with the AC detection signals $V_R$, $V_S$, and $V_T$, and outputs them to the three-phase/two-phase conversion unit 22, when the AC detection signals $V_R$, $V_S$, and $V_T$ are not output from the supply voltage detecting unit 21.

Meanwhile, the phase detecting unit 25 cannot detect the phase of the three-phase AC power supply 2 when the residual vibration signals from the signal processing units 23 or 23A is attenuated and its amplitude becomes zero even if a gain is increased. Therefore, it can be configured to use phase information generated by a phase information generating unit that is separately provided when a power outage is detected.

Figure 10:
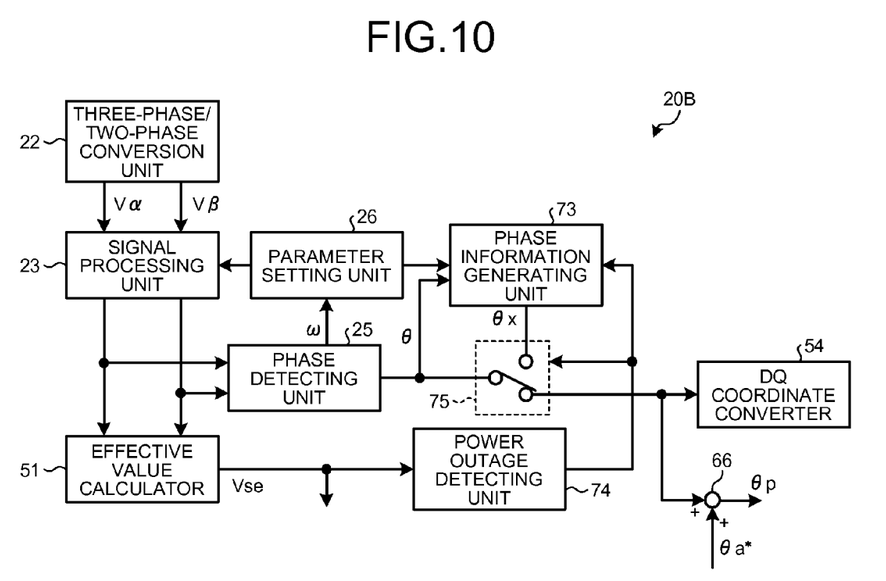
FIG. 10 is a diagram illustrating a part of still another configuration of the control unit of the power regeneration device.

FIG. 10 is a diagram illustrating a part of another configuration of the control unit in the power regeneration device 1. A control unit 20B illustrated in FIG. 10 further includes a phase information generating unit 73, a power outage detecting unit 74, and a switching unit 75 in addition to the configuration of the control unit 20 illustrated in FIG. 3.

The phase information generating unit 73 is configured to be able to output phase information according to frequency set by the parameter setting unit 26. Setting frequency by the parameter setting unit 26 is performed, for example, during the initial operation described above, similarly to the signal processing unit 23.

When the effective voltage value Vse from the effective value calculator 51 is not more than a predetermined value, the power outage detecting unit 74 determines that the supply of power from the three-phase AC power supply 2 is stopped to be in a power outage state. When it is determined that the present state is the power outage state, the power outage detecting unit 74 outputs an operation reference to the phase information generating unit 73 and outputs a switching reference to the switching unit 75.

When the switching reference is input from the power outage detecting unit 74, the switching unit 75 selects phase information ex from the phase information generating unit 73, as a signal to be output to the dq coordinate converter 54 and the adder 66, in place of the voltage phase detection value $\theta$ from the phase detecting unit 25. Moreover, when the operation reference is input from the power outage detecting unit 74, the phase information generating unit 73 selects the phase information $\theta x$ whose phase is continued to the voltage phase detection value $\theta$ and outputs it to the switching unit 75.

Therefore, after the power outage state is detected by the power outage detecting unit 74, the phase of the three-phase AC power supply 2 can be detected (estimated) on the basis of the phase information $\theta x$ from the phase information generating unit 73 and thus out-of-synchronization with the phase of the three-phase AC power supply 2 after the power recovery can be suppressed.

Moreover, until the power outage is detected by the power outage detecting unit 74, the phase detecting unit 25 can detect the phase of the three-phase AC power supply 2 by using the residual vibration signals. Therefore, even if power is recovered from the power outage until the power outage is detected by the power outage detecting unit 74, out-of-synchronization with the phase of the three-phase AC power supply 2 after the power recovery can be suppressed.

Second Embodiment

Figure 11:
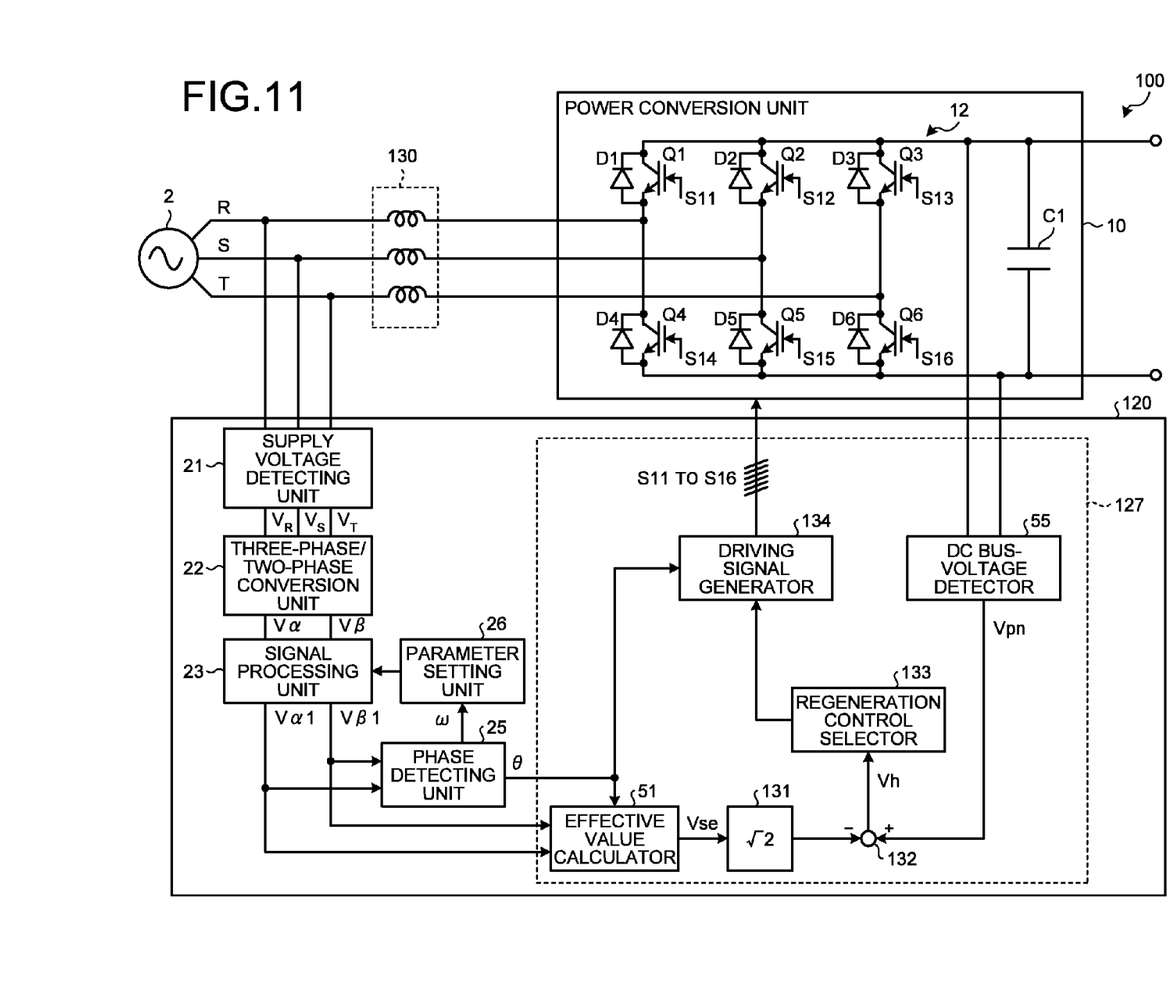
FIG. 11 is a diagram illustrating the configuration of a power regeneration device according to a second embodiment.

Next, a power regeneration device 100 according to the second embodiment will be explained. It has been explained that the power regeneration device 1 according to the first embodiment controls the three-phase bridge circuit 12 on the basis of a PWM signal. On the contrary, the power regeneration device 100 according to the second embodiment controls the three-phase bridge circuit 12 by using a 120-degree energization method. Herein, components of the power regeneration device 100 having the same function as that of the power regeneration device 1 according to the first embodiment have the same reference numbers, and overlapping explanations are omitted.

FIG. 11 is a diagram illustrating the configuration of the power regeneration device 100 according to the second embodiment. As illustrated in FIG. 11, the power regeneration device 100 includes the power conversion unit 10, a control unit 120, and a filter 130.

The control unit 120 of the power regeneration device 100 includes the supply voltage detecting unit 21, the three-phase/two-phase conversion unit 22, the signal processing unit 23, the phase detecting unit 25, the parameter setting unit 26, and a drive control unit 127. In the power regeneration device 100, the signal processing unit 23 generates a residual vibration signal in a power outage and the phase detecting unit 25 generates a voltage phase detection value θ on the basis of the residual vibration signal generated by the signal processing unit 23, similarly to the power regeneration device 1 according to the first embodiment.

The drive control unit 127 includes the effective value calculator 51, the DC bus-voltage detector 55, a multiplier 131, a subtractor 132, a regeneration control selector 133, and a driving signal generator 134. The drive control unit 127 controls the power conversion unit 10 on the basis of the voltage phase detection value θ.

The multiplier 131 multiplies √2 by the effective voltage value Vse computed by the effective value calculator 51 to compute a value √2·Vse. The subtractor 132 subtracts the value √2·Vse computed by the multiplier 131 from the DC voltage value Vpn from the DC bus-voltage detector 55 and outputs the result to the regeneration control selector 133 as a differential voltage value Vh.

When the differential voltage value Vh from the subtractor 132 is not less than a preset threshold V1, the regeneration control selector 133 outputs a regeneration reference to the driving signal generator 134. Moreover, when the differential voltage value Vh from the subtractor 132 is not more than a preset threshold V2 in the state where the regeneration reference is being output, the regeneration control selector 133 outputs a stop reference to the driving signal generator 134. In this case, the threshold V2 is smaller than the threshold V1.

The drive control unit 127 performs 120-degree energization control on the basis of the voltage phase detection value θ from the phase detecting unit 25 and outputs an AC voltage synchronized with the three-phase AC power supply 2. More specifically, the drive control unit 127 generates six driving signals S11 to S16, which are respectively applied to control terminals of the switching elements Q1 to Q6 that constitute the three-phase bridge circuit 12 of the power conversion unit 10, on the basis of the voltage phase detection value θ, and outputs the six driving signals to the switching elements Q1 to Q6.

Figure 12:
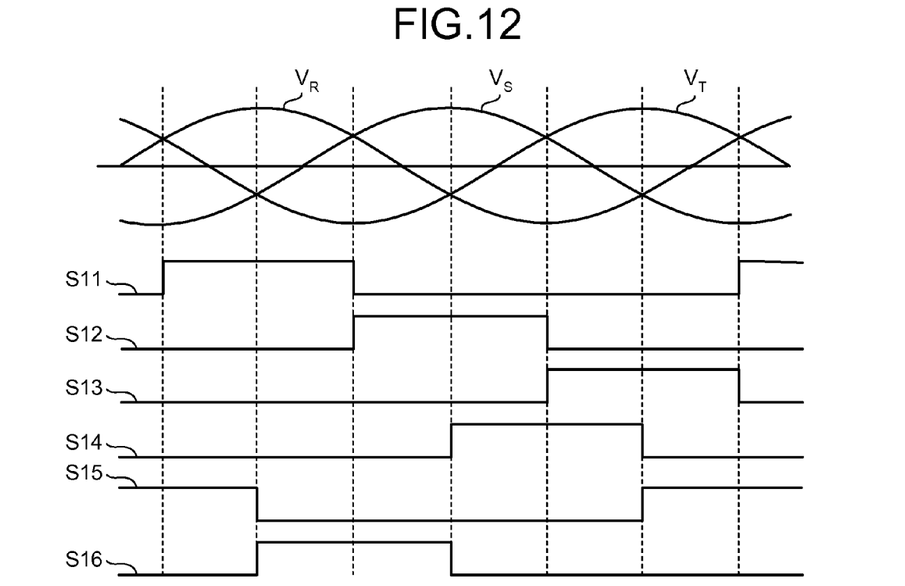
FIG. 12 is a diagram explaining 120-degree electrification control.

FIG. 12 is a diagram explaining 120-degree energization control. As illustrated in FIG. 12, the drive control unit 127 generates the driving signals S11 to S16 for controlling the switching elements Q1 to Q6 in such a manner that regeneration currents flow into between a phase at which the voltage of the three-phase AC power supply 2 is the highest and a phase at which the voltage is the lowest. Herein, the driving signals S11 to S16 become ON references by which the switching elements Q1 to Q6 enter ON states at the High level.

As described above, the power regeneration device 100 that performs 120-degree energization control also enters a self-oscillation state in the power outage state, generates the residual vibration signal, whose frequency is the same as that of and whose phase is continued to that of the AC detection signal just before the stop, by using residual vibration, and detects the phase of the three-phase AC power supply 2. Therefore, out-of-synchronization with the phase of the three-phase AC power supply 2 at the power recovery can be suppressed, and thus continuous operations in the power regeneration device 100 can be performed with high precision.

In the present embodiment, the power regeneration device that performs 120-degree energization control has been explained by using FIG. 11 as an example of the configuration corresponding to FIG. 3. However, the power regeneration device can have various configurations described in the first embodiment. Moreover, the power conversion device can be configured by connecting two or more the inverter devices 3 to the power regeneration device 100.

Third Embodiment

Figure 13:
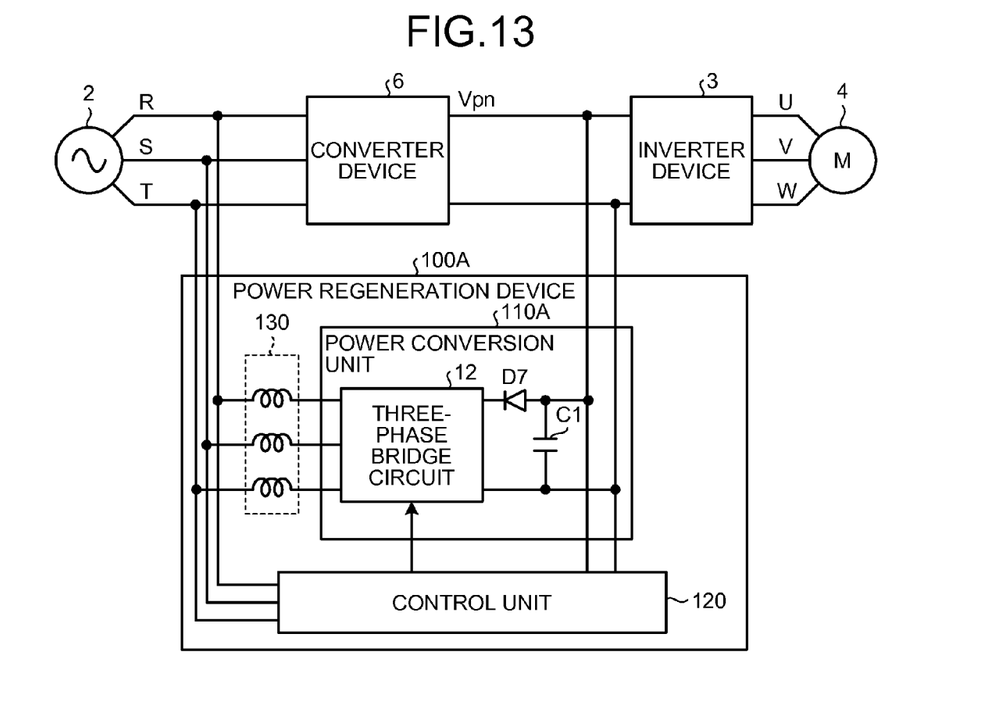
FIG. 13 is a diagram illustrating the configuration of a power regeneration device according to a third embodiment.

Next, a power regeneration device and a power conversion device according to the third embodiment will be explained. The power regeneration device 100 according to the second embodiment is configured to include the three-phase bridge circuit 12 that functions as a converter during power running. However, the power regeneration device according to the third embodiment does not have a component that functions as a converter during power running.

FIG. 13 is a diagram illustrating the configuration of a power regeneration device 100A according to the third embodiment. The components of FIG. 13 having the same functions as those of the components illustrated in FIG. 11 have the same reference numbers, and overlapping explanations are omitted.

As illustrated in FIG. 13, the power regeneration device 100A according to the third embodiment includes a power conversion unit 110A, the control unit 120, and the filter 130. Although the power conversion unit 110A includes the three-phase bridge circuit 12, the smoothing capacitor C1, and a diode D7, the power conversion unit 110A does not have a function for operating as a converter during power running due to the action of the diode D7. In other words, the power conversion unit 110A performs only power regeneration without functioning as a converter device.

The power regeneration device 100A is connected between connection points between the three-phase AC power supply 2 and a converter device 6 and connection points between the converter device 6 and the inverter device 3. The main function of the power regeneration device 100A is power regeneration for supplying an induced electromotive force caused by the deceleration of the motor 4 on the motor 4 to the three-phase AC power supply 2.

The inverter device 3 outputs the induced electromotive force on the motor 4 toward the converter device 6 during the deceleration of the motor 4. The power output from the inverter device 3 to the converter device 6 is accumulated in the smoothing capacitor C1. When DC power not less than a predetermined value is accumulated in the smoothing capacitor C1, the power regeneration device 100A drives the three-phase bridge circuit 12 by using the 120-degree energization method.

The control unit 120 of the power regeneration device 100A enters a self-oscillation state in a power outage state and generates a residual vibration signal, whose frequency is the same as that of and whose phase is continued to that of an AC detection signal just before the stop, by using residual vibration. The control unit 120 detects the phase of the three-phase AC power supply 2 on the basis of the generated residual vibration signal and drives the power conversion unit 110 in synchronization with the detected phase by using the 120-degree energization method.

Therefore, similarly to the power regeneration device 1, the power regeneration device 100A can also suppress out-of-synchronization with the phase of the three-phase AC power supply 2 at the power recovery and thus can perform continuous operations with high precision.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A power regeneration device comprising:
a voltage detecting unit that detects an AC voltage from an AC power supply and outputs an AC detection signal according to the AC voltage;
a signal processing unit that generates, by using self-oscillation when an output of the AC detection signal from the voltage detecting unit is stopped due to a power outage, an AC signal whose frequency is a same as that of and whose phase is continued to that of the AC detection signal just before the stop;
a phase detecting unit that detects a phase of the AC power supply on the basis of the AC signal when power is recovered from the power outage; and
a power conversion unit that converts DC power into AC power and regenerates the AC power to the AC power supply.

2. The power regeneration device according to claim 1, wherein the signal processing unit is a filter that is connected between the voltage detecting unit and the phase detecting unit and that makes the AC detection signal from the voltage detecting unit pass therethrough by setting a frequency of the AC power supply in a pass band and generates the AC signal by using the self-oscillation when the output of the AC detection signal from the voltage detecting unit is stopped.

3. The power regeneration device according to claim 2, wherein the filter is a secondary bandpass filter or a secondary low-pass filter.

4. The power regeneration device according to claim 2, further comprising a parameter setting unit that sets a parameter for defining a characteristic of the filter in accordance with the frequency of the AC power supply.

5. The power regeneration device according to claim 3, further comprising a parameter setting unit that sets a parameter for defining a characteristic of the filter in accordance with the frequency of the AC power supply.

6. The power regeneration device according to claim 3, wherein the filter performs, when the output of the AC detection signal from the voltage detecting unit is started, a first mode for making the AC detection signal pass therethrough without change and then shifts to a second mode for operating as a filter for the AC detection signal.

7. The power regeneration device according to claim 4, wherein the filter performs, when the output of the AC detection signal from the voltage detecting unit is started, a first mode for making the AC detection signal pass therethrough without change and then shifts to a second mode for operating as a filter for the AC detection signal.

8. The power regeneration device according to claim 5, wherein the filter performs, when the output of the AC detection signal from the voltage detecting unit is started, a first mode for making the AC detection signal pass therethrough without change and then shifts to a second mode for operating as a filter for the AC detection signal.

9. The power regeneration device according to claim 1, wherein the power conversion unit has a function for converting the AC power from the AC power supply into DC power.

10. The power regeneration device according to claim 2, wherein the power conversion unit has a function for converting the AC power from the AC power supply into DC power.

11. A power conversion device comprising:
a power regeneration device; and
one or more inverter devices that are connected to the power regeneration device,
the power regeneration device comprising:
a voltage detecting unit that detects an AC voltage from an AC power supply and outputs an AC detection signal according to the AC voltage;
a signal processing unit that generates, by using self-oscillation when an output of the AC detection signal from the voltage detecting unit is stopped due to a power outage, an AC signal whose frequency is a same as that of and whose phase is continued to that of the AC detection signal just before the stop;
a phase detecting unit that detects a phase of the AC power supply on the basis of the AC signal when power is recovered from the power outage; and
a power conversion unit that converts DC power into AC power and regenerates the AC power to the AC power supply.

12. The power conversion device according to claim 11, wherein the signal processing unit is a filter that is connected between the voltage detecting unit and the phase detecting unit and that makes the AC detection signal from the voltage detecting unit pass therethrough by setting a frequency of the AC power supply in a pass band and generates the AC signal by using the self-oscillation when the output of the AC detection signal from the voltage detecting unit is stopped.

13. A power regeneration device comprising:
a voltage detecting means that detects an AC voltage from an AC power supply and outputs an AC detection signal according to the AC voltage;
a signal processing means that generates, by using self-oscillation when an output of the AC detection signal from the voltage detecting means is stopped due to a power outage, an AC signal whose frequency is a same as that of and whose phase is continued to that of the AC detection signal just before the stop;
a phase detecting means that detects a phase of the AC power supply on the basis of the AC signal when power is recovered from the power outage; and
a power conversion means that converts DC power into AC power and regenerates the AC power to the AC power supply.

* * * * *